April 13, 1965  E. C. HADLEY ETAL  3,178,677
SOUND TRANSMISSION SYSTEMS
Filed May 18, 1961  3 Sheets-Sheet 1

INVENTORS
EUGENE C. HADLEY
GEORGE F. HOKE
BY
Fraser and Boguchi
ATTORNEYS

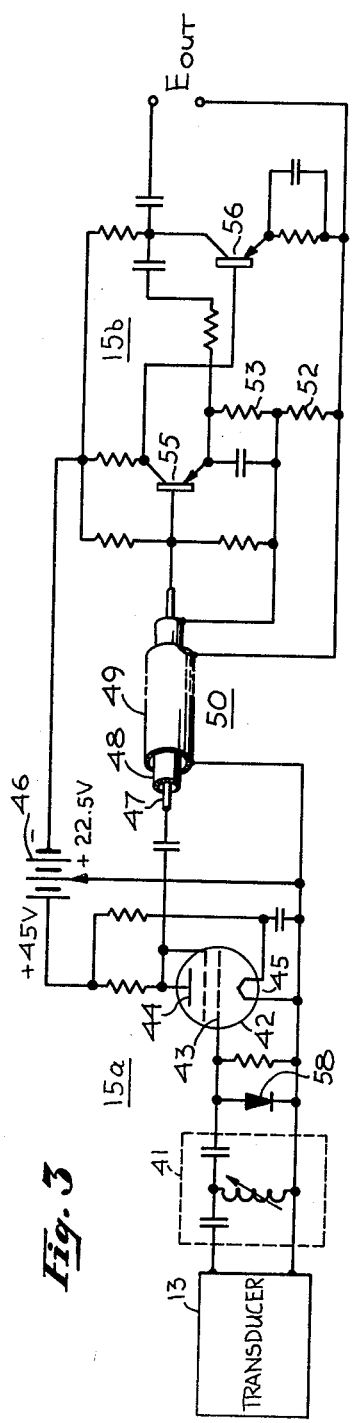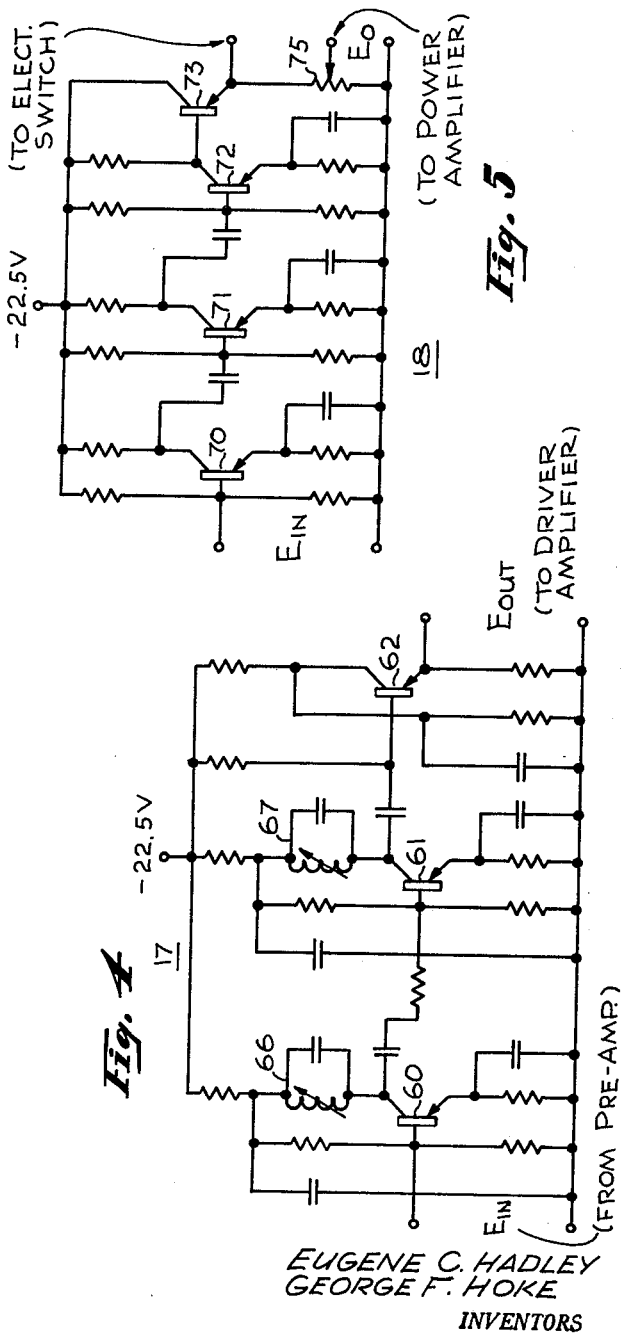

April 13, 1965 E. C. HADLEY ETAL 3,178,677
SOUND TRANSMISSION SYSTEMS
Filed May 18, 1961 3 Sheets-Sheet 3

EUGENE C. HADLEY
GEORGE F. HOKE
INVENTORS

BY Fraser and Bozucki
ATTORNEYS

3,178,677
SOUND TRANSMISSION SYSTEMS
Eugene C. Hadley, 11271 Rainier Court, Garden Grove, Calif., and George F. Hoke, 325 Alvarado Place, Newport Beach, Calif.
Filed May 18, 1961, Ser. No. 111,058
8 Claims. (Cl. 340—1)

This invention relates to improvements in systems for the transmission and use of sound waves, and particularly to circuits and systems for the use of high frequency acoustic waves at relatively long distances.

Acoustic waves transmitted through the atmosphere or other media are now being employed in a number of different applications. Infrasonic waves (those waves below the lower frequency limit of the audible sound range) are being considered for use in communications and signaling systems, while ultrasonic waves are currently widely employed in different types of signaling systems, particularly in remote control devices for television sets, garage door controls, and burglar control systems. Useful ultarsonic devices, however, have had only a restricted range, generally on the order of only a few feet. This has been due to the fact that it has heretofore been considered that attenuation of the sound wave energy at higher frequencies limits the extent of the useful range which can be achieved. It has been thought, for example, that a practical limitation is imposed on the range at which ultrasonic systems may be operated, because the attenuation of acoustic waves in the atmosphere increases as the square of the frequency of the waves. Accordingly, attempts to signal by using acoustic waves over long distances are being directed within the infrasonic region. The use of such extremely low frequencies, however, places sharp limitations on the rate at which information can be communicated.

The uses of ultrasonic waves at limited distances include, in addition to those mentioned above, various continuous wave devices which utilize the Doppler principle to determine the distance of an object from which an echo is derived, and the many and well known devices for generating acoustic waves in fluid media. The first mentioned class of devices provides obstacle detectors for the blind, distance measuring systems operating at limited range, and the like. The latter class of devices includes sonar, liquid level measuring systems, ultrasonic cleaners, flow rate measurement and various flaw detectors for operating with solid bodies.

Despite these widespread uses of acoustic waves in various environments, no known devices have heretofore provided reliable and useful transmission of ultrasonic waves at relatively long distances. Those familiar with the art will recognize the widespread potential of any system which can reliably operate at distances from a mile down to a few feet. Electromagnetic radar, for example, whether pulses or Doppler, is not only complex and expensive but has inherent limitations and inaccuracies at short ranges. As applied to aircraft, electromagnetic radar is not suitable for obstacle detection, collision warning, or altitude determination when the range involved is a few hundred yards or less, because the reflection which is received is almost instantaneous and is effectively obscured by the transmitted pulse.

Another example, out of many which might be given, of the potential utility of an ultrasonic transmission system having an appreciable range is found in the automatic remote control field. While electromagnetic radiations might be used, the electromagnetic spectrum is becoming so crowded that few frequencies are available for this purpose. Thus an operative ultrasonic device would be useful to permit independent control, without interference with other transmissions. A great many examples of the potential utility of point-to-point communications or reflected transmissions using ultrasonic waves might be given, but it will be appreciated that no such list would be all-inclusive of the uses to which an ultrasonic system of relatively long range could be put. The mere transmission of acoustic power from one point to another might well be used to great benefit, as in frightening or immobilizing birds or animals on an airport runway or in a wild habitation.

It is therefore an object of the present invention to provide novel systems and circuits for acoustic wave transmission at greater distances than has heretofore been found feasible.

Another object of the present invention is to provide an improved sound transmission system.

Yet another object of the present invention is to provide improved object detection and ranging systems utilizing ultrasonic waves.

A further object of the present invention is to provide ultrasonic wave transmission systems having capabilities for ranging, direction finding, signaling and automatic control.

Another object of the present invention is to provide extremely simple systems utilizing reflected acoustic waves for detection and control purposes.

Yet another object of the present invention is to provide relatively simple and inexpensive systems for directing a large amount of acoustic power between selected points.

Sound transmission systems in accordance with the present invention transmit high frequency ultrasonic waves at long distances utilizing wave transducers for collimating transmitted waves and for concentrating received waves. In addition, both the devices for converting acoustic waves to and from electrical signals, and the electrical circuitry, are arranged to be extremely narrow band with relation to a selected resonant frequency.

Systems in accordance with the invention may utilize individual or combined transducers for converting electrical signals to and from acoustic waves, as well as wave transducers for collimating or concentrating, or both collimating and concentrating, the acoustic waves. High power transmitted waves are generated at a selected high ultrasonic frequency by excitation of the acoustic transducer which in turn provides waves to be concentrated by the wave transducer. At the same or a different location, the waves which are reflected or received are concentrated by the same or a different wave transducer, and the same or a different acoustic transducer is utilized to generate corresponding electrical signals. The low level input signals derived at the transducer are amplified by circuitry matched to the transducer so as to enable adjustment of the transducer bandwidth and to reduce signal losses in the input stages. The signals may thereafter be amplified further by tuned amplifier circuits which produce output pulses which may be utilized to indicate the time of reception of the received waves, if a ranging function is being performed, or the nature of the pulse sequence, if signaling or some other function is being performed.

In a specific example of a system in accordance with the invention, separate transmitting and receiving acoustic transducers may be employed in conjunction with one or more wave transducers. An acoustic coupling may be established between the receiving and transmitting transducers, and an electrical circuit coupling is used between the receiving transducer and the transmitting transducer, to provide a complete operative loop. Synchronizing circuits coupled to the transmitting transducer normally maintain a short circuit across the transmitting transducer so that no transmitted waves are generated and the receiving transducer is responsive only to waves impinging upon the reflector or other wave transducer. When it is desired to initiate a pulse, however, the short circuit is removed under control of the synchronizing circuits, and the closed circuit which includes the acoustic coupling quickly begins to oscillate at a selected but narrowly controlled frequency. A power amplifier coupled to the transmitting transducer provides a high power oscillatory burst which results in the propagation into space of an acoustic wave burst of the selected duration. Received pulses concentrated by the wave transducer at the receiving transducer generate electrical signals which excite a tuned amplifier and subsequent amplifier stages which generate a pulse of standard form. These pulses are used in conjunction with specially arranged output devices to provide both an aural and visual indication of the relationship in time of the received echo to the initial transmitted pulse. The aural indication signifies the detection of an object within the range of the system, while the visual indication provides a measure of the distance as well as the presence of the object.

A feature of the present invention is the use of limiting circuits in the coupling to the receiving transducer. Signal preamplifiers may be employed, for example, which are self-limiting to strong input signals, and which therefore prevent the passage of undue power levels to the subsequent circuits. In addition, a driver amplifier circuit may be employed which controls loop gain, and therefore determines the transmitted power, during the transmit mode of operation. These limiting features concurrently are used in conjunction with the pulse generators which are coupled to the output circuits and display devices so as to achieve great simplification. Conventional envelope detection techniques are not employed with this arrangement, but instead a diode circuit is used which very simply provides a pulse suitable for the control of the display devices. A particularly simple but efficient display device is provided by a slotted rotating disc and stroboscopic light arrangement which is pulsed coincident with the transmittal of a pulse to provide a reference light indication, and coincident with the reception of a pulse to provide an echo reception indication whose angular spacing from the transmitted pulse indication is a direct measure of the distance of the reflecting object.

Another feature of the present invention is the employment of a fail-safe arrangement in the display circuitry. Received pulses may be utilized to deenergize a relay, so that a clearly erroneous indication is provided by the system in the event that there is a power failure.

A further feature in accordance with the invention is the employment of interconnected dual preamplifier stages which are specially interconnected with the receiving transducer to match the impedance of the receiving transducer and to reduce the capacitance of the interconnecting cable. The first preamplifier stage is a special high impedance circuit which additionally may be varied to adjust the receiving transducer bandwidth and to match its output impedance to the input impedance of the receiver circuitry so as to provide isolation of the transducer from the receiver.

The novel features of the invention may be better understood by reference to the following description, taken in conjunction with the accompanying drawings, in which:

FIG. 3 is a schematic diagram representation of input circuits in accordance with the invention for employment in the arrangement of FIG. 1;

FIG. 4 is a schematic diagram of a tuned amplifier circuit in accordance with the invention which may be employed in the system of FIG. 1;

FIG. 5 is a schematic diagram of the driver amplifier circuit in accordance with the invention which may be employed in the system of FIG. 1;

Figure 1:
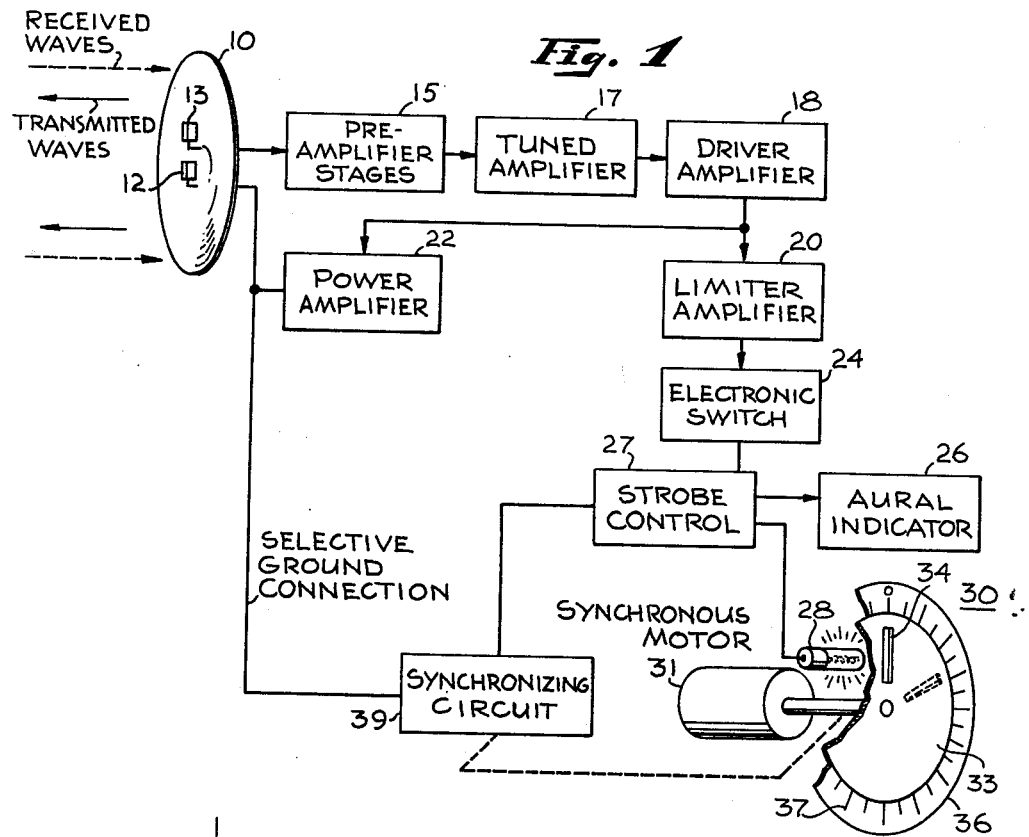
FIG. 1 is a block diagram representation of the system in accordance with the invention.

A particularly suitable example of a sound transmission system in accordance with the invention is shown in block diagram form in FIG. 1, to which reference may now be made. The system shown is constructed and described with reference to object detection and ranging by the use of reflected echoes. The specific example is provided merely to clarify the understanding of the invention, and it is to be expressly understood that those skilled in the art will recognize many different uses for the system and for the various features which it includes.

For simplicity and economy, the system utilizes a wave transducer, here a parabolic reflector 10 which provides collimation of transmitted acoustic waves, and concentration of received waves at two centrally located acoustic transducers. Although a single transducer may be employed for both transmitting and receiving, it is preferred in the present instance to use a separate transmitting transducer 12 and a receiving acoustic transducer 13. The term "transducer" is properly applied to both the wave transducer 10 and the acoustic transducers 12, 13, although the functions which are involved are different, inasmuch as in one space propagated acoustic waves are converted to or from concentrated sources of acoustic energy, whereas in the other electrical signals are converted to or from acoustic energy. Although any of a considerable number of presently commercially available transducers may be employed, one suitable type is sold as the Model TR-7 transducer of Massa Laboratories, Inc. Division of Cohu Electronics, Inc., Hingham, Mass. A model having a resonant frequency of 40 kilocycles (hereinafter kc.), with relative narrow bandwidth, little harmonic response, and a directional characteristic having a 3 db loss at 20° on either side of the beam center is employed. The power rating of this device is ½ watt under steady state operation and 5 watts with a 10% duty cycle with an applied 50 volts R.M.S. and 150 volts R.M.S. respectively. Alternatively, as described below, a gas-driven acoustic oscillator has particular advantages in many applications where high power or other features are desired.

Electrical signals excited in the receiving transducer 13 are coupled to associated preamplifier stages 15. While the incoming signal will often be of sufficient amplitude to permit the use of commonly known preamplifiers, it is preferred to employ improved circuits shown in detail in FIG. 3. These circuits minimize losses in amplifying the low level signals, provide a superior impedance match between the receiving transducer 13 and the receiver circuitry, and include a signal limiting feature, as well as other features, which contribute appreciably to performance while avoiding cost and complexity. The preamplified signals are applied to a tuned amplifier 17 which may be in the form of an amplifier having a narrow bandpass which encompasses the nominal center frequency of the receiving transducer 13. A particularly suitable tuned amplifier 17 is described below in detail in conjunction with FIG. 4, and has the advantages of being tunable in center frequency while providing extremely high rejection of off-center frequencies.

The output terminal of the tuned amplifier 17 is coupled to the input terminal of a driver amplifier 18 which is arranged to provide sufficient gain for the excitation of associated display circuitry and devices. The driver amplifier, as described in conjunction with the detailed example of FIG. 5, includes gain control setting circuits. Output signals from the driver amplifier are applied to a limiter amplifier 20 and also to a power amplifier 22.

The limiter amplifier 20 may be a high gain amplifier incorporating a clipping feature of conventional design, for providing uniform signals to an associated electronic switch 24. The power amplifier 22 does not operate in the receiving loop but serves to complete a feedback loop between the successive amplifier stages 15, 17 and 18 and the transmitting and receiving transducers 12 and 13. While the power amplifier 22 is here arranged to receive signals continually, a selective ground connection (or other switching arrangement) coupled both to the power amplifier 22 and the transmitting transducer 12 confines the application of energizing pulses to the transmitting transducer 12 solely to the intervals in which the ground connection is broken. The term "ground connection," of course, does not mean that a zero voltage is necessarily required, but should be taken to refer to some reference signal level suitable for disabling the energization of the transmitting transducer 12.

Figure 6:
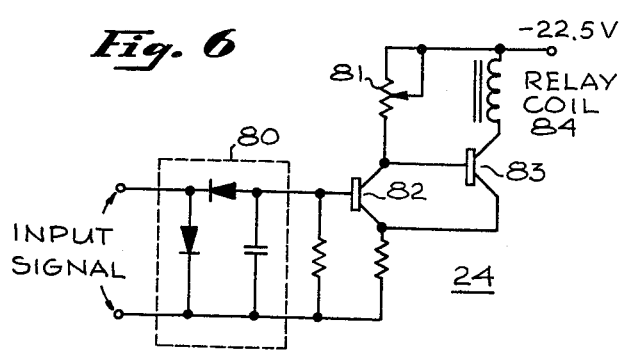
FIG. 6 is a schematic diagram of an electronic switch circuit in accordance with the invention which may be employed in the system of FIG. 1.

A preferred example of the electronic switch 24 is shown in FIG. 6, in conjunction with which a number of advantageous features are discussed. The signal received from the limiter amplifier 20 is converted to a D.C. pulse or signal in the electronic switch 24, and this pulse or signal is utilized to actuate the associated indicator and display devices. A feature of the arrangement which is preferred is that the electronic switch 24 is normally energized, and is selectively deenergized by the applied signals, so that a clear indication of error is provided in the event that a power failure or circuit failure occurs. The amplitude at which the electronic switch 24 is actuated may also, as described in conjunction with FIG. 6, be selectively varied.

Output signals from the electronic switch 24 are applied to a strobe control stage 27 which in turn energizes an aural indicator 26, such as a buzzer or horn, and also a stroboscopic light 28 adjacent a visual display 30. In the visual display 30, a synchronous motor 31 rotating at a selected rate of speed drives a display disc 33 having an index slot 34. The illumination from the stroboscopic light 28 is sufficiently well distributed for an observer on the side of the display disc 33 remote from the light 28 to see an apparent illuminated line at the position of the index slot 34, no matter what the rotational position of the index slot 34. If desired, a light of circular configuration, several lights, or light diffusers may be employed to achieve equal illumination. Timing or range indicia may be provided on a transparent plate superimposed between the display disc 33 and an observer, but for purposes of illustration an external range marker ring 36 having indicia 37 which denote the range in yards and nautical miles is disposed about the periphery of the display disc 33. The synchronous motor 31 is also mechanically coupled to control a synchronizing circuit 39 which provides two separate signals or functions. At a selected point in the rotational movement of the shaft of the synchronous motor 31, the synchronizing circuit 39 removes the ground connection of the power amplifier 22 and the transmitting transducer 12 or switches to the "on" condition by other means. At approximately the same time, the synchronizing circuit 39 provides a signal to the strobe control stage 27 to actuate the stroboscopic light 28 and aural indicator 26 at time $T_0$ so as to provide a reference marker display on the visual display 30 and an audible signal. After a selected, relatively brief interval, controlled by the rotation of the synchronous motor 31, the selected ground connection is again reinserted by the synchronizing circuit 39 and the energizing signal for the light 28 is terminated. This operation may therefore be seen to be generally analogous to the widely used but much more complicated synchronizers of electromagnetic radar. A number of devices and systems are available for performing this function, and so the synchronizing circuit 39 has not been illustrated in detail. Because of the relatively slow speeds of operation of an acoustic system, by comparison to electromagnetic radar, vastly simpler mechanisms may be utilized. As one example, the mechanical coupling to the shaft of the synchronous motor 31 may include only an appropriate cam contour surface on the shaft, together with a cam follower actuated switch. The position of the cam surface on the shaft thus would determine the point in time at which the selected ground connection was initially broken and the indicators were energized at time $T_0$, and the circumferential length of the cam surface would determine the interval of energization. Separate cam surfaces and followers might, of course, be used for providing these two functions. The synchronizing circuit 39 would then consist merely of relays coupled between appropriate power supplies and ground connections and controlled by the operation of the switch. For higher speed operation, magnetic or optical pickoffs might be used, together with electronic switching and gating circuits.

In operation, the system of FIG. 1 functions to perform object detection and ranging functions at long range and in a reliable fashion. For the majority of an operative cycle, the power amplifier 22 and the transmitting transducer 12 are maintained deenergized, by the selective ground connection controlled by the synchronizing circuit 39. The preamplifier stages 15 and the associated receiver circuits are responsive to signals generated by the receiving transducer 13 from externally generated waves which may be considered random noise. The bandwidth of the receiving transducer 13 and the tuned amplifier 17 is so narrow, however, that a high degree of automatic discrimination against noise effects is provided. Operative cycles may be assumed to commence when the timing control device, here the synchronous motor 31, reaches a selected index point in its cycle. Upon reaching the index point, the coupled synchronizing circuit 39 provides signals to activate the stroboscopic light 28, and aural indicator 26, and to disable the ground connection to the power amplifier 22 and the transmitting transducer 12. The synchronizing circuit 39 may interpose a selected time delay between the disabling of the ground connection and the initiation of the flashing of the light 28, to allow for signal build-up in the resonant loop which is utilized to generate the transmitted pulse.

The resonant loop which controls the generation of acoustic waves to be transmitted includes the acoustic coupling between the transmitting transducer 12 and the receiving transducer 13, and the circuit path which includes the preamplifier stages 15, the tuned amplifier 17, the driver amplifier 18 and the power amplifier 22. When the ground connection is disabled, the power amplifier 22 provides a high level signal for activating the transmitting transducer 12. The transmitting transducer 12, however, is resonant only at the selected frequency (40 kc.) of the receiving transducer 13. The noise effects at 40 kc. in the received acoustic waves do cause a minute amount of excitation of the receiving transducer 13. The low level electrical signal which is derived from these noise effects is amplified in the preamplifier stages 15 and results in an initially small signal being derived from the tuned amplifier 17. The somewhat amplified signal from the tuned amplifier is passed through the driver amplifier 18 with additional gain, and, although still small, a signal is applied from the power amplifier 22 to excite the transmitting transducer 12 at a frequency of 40 kc. The acoustic waves thus generated appreciably enhance the excitation of the receiving transducer 13, so that the amplitude of the 40 kc. signal is very quickly built up. In effect, both the acoustically coupled and electrically coupled parts of this system may be considered to define a complete loop which is resonant at 40 kc. The signal build-up is so rapid, relative to the duration of the transmitted oscillatory burst, that the build-up time does not require any special precautions in the further processing of the derived signals.

During the interval in which high power acoustic waves are generated by the transmitting transducer 12, therefore, a well concentrated and directed beam of acoustic waves at 40 kc. is directed from the parabolic reflector 10 into space in a selected direction. The parabolic reflector 10 provides a marked apparent power gain, which may be 20 to 30 db or greater.

In electromagnetic radar and many other systems, extensive measures must be undertaken to prevent damage to sensitive receiver circuitry from the application of high power transmitted pulses. In the present arrangement, however, the limiting which is effected in the preamplifier stages 15 and in the limiter amplifier 20 provides a restriction on the amplitude of the signal which is provided to the electronic switch 24, and no damage results. A variable gain setting in the driver amplifier 18 may be utilized to control the over-all gain in the power transmitting loop, and thus control the power of the transmitted oscillatory burst.

The transmitted pulse is terminated by the reinsertion of the selected ground connection by the synchronizing circuit 39, as controlled by the mechanical coupling to the synchronous motor 31.

The choice of the duration of the transmitted pulse is made relative to the maximum and minimum ranges to be used for the system. With longer range detection it is preferable to increase pulse duration, but this in turn increases the minimum range and decreases the possible repetition rate. For the present example, assuming it is desired to have a maximum range of approximately 1000 yards and a minimum range of approximately 45 yards, a 250 millisecond oscillatory burst is employed. During the transmitted pulse, the signal derived at the limiter amplifier may actuate the electronic switch 24, so as to energize the aural indicator 26 and the light 28. If it is not desired to use a stroboscopic effect, the light need not be a stroboscopic device but may be a slower acting source of illumination. Alternatively, if desired, the signal from the synchronizing circuit 39 which marks the start of a cycle may be used to disable the electronic switch 24, so that the visual indication is controlled by the synchronizing circuit 39 alone, and no sound is provided from the aural indicator 26 at the start of a cycle.

When the transmitted oscillatory burst of acoustic waves encounters a distant object, reflected waves are directed back toward the parabolic reflector 10. Upon concentration at the receiving transducer 13, corresponding electrical signals are generated at a time interval relative to the transmitted pulse which is proportional to the distance of the object creating the reflections. These reflections are successively amplified in the preamplifier stages 15, the tuned amplifier 17 and the driver amplifier 18. The tuned amplifier markedly increases the rejection of the signals outside the selected frequency band, and a signal with a high signal-to-noise ratio is provided to the limiter amplifier 20. While the received signals will initially vary in amplitude, in accordance with the characteristics of the reflecting distant object, the limiter amplifier 20 effectively standardizes the received signal indications. The signal applied to the electronic switch 24 is converted to a D.C. waveform which corresponds to the envelope of the oscillatory burst, and the D.C. waveform is utilized to generate a trigger pulse of a selected duration which actuates the aural indicator 26 and the light 28. The aural indicator 26 advantageously permits an operator to perform other duties while still being informed of the detection of a distant object. The light 28 flashes in response to the received signal at a time in the cycle of revolution of the display disc 33 at which the index slot 34 is at a circumferential position which indicates the range of the distant object on the marker ring 36. The operator is immediately aware of the distance of the reflecting object, from the spacing between the initial index light line, and the received echo light line which are shown on the face of the display disc 33 as presented to him.

Figure 2:
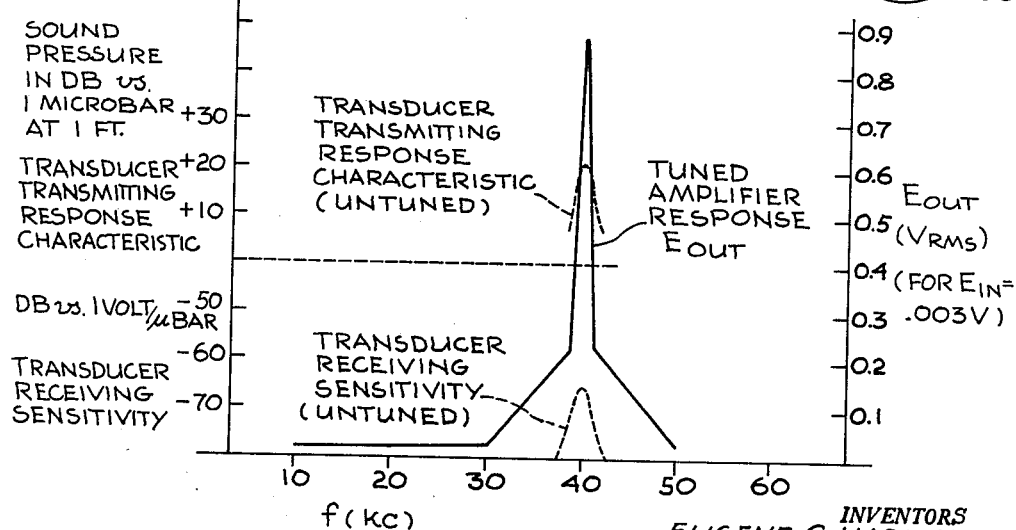
FIG. 2 is a graphical representation of curves of response versus frequency useful in explaining the operation of the system.

A feature which is of great utility in the operation of the system is derived from the bandwidth relationships of the transmitting and receiving transducers and the tuned amplifier. As shown in FIG. 2, the response curve of the tuned amplifier peaks very sharply at the selected resonant frequency (40 kc.). The response characteristic of the transmitting transducer, without a tuning choke, also peaks at 40 kc. but has a slightly wider bandwidth. This bandwidth may be appreciably reduced by the use of a tuning choke. Similarly, the sensitivity of the receiving transducer, without tuning, is greatest at 40 kc. and occupies a bandwidth of approximately 2 kc. The sensitivity may be increased, or the bandwidth widened by the use of appropriate tuning elements.

The operation of the system of FIG. 1 combines these relationships together with the greater directivity achieved by use of the wave transducer 10 to provide markedly greater range than has heretofore been possible with acoustic wave systems. The bandwidths are still sufficiently wide enough to encompass frequency shifts which are likely to be introduced because of Doppler effects but there is a high degree of rejection of harmonics and random and ambient noise. Note that received pulses from an extraneous source (e.g. another like system in the vicinity) appear in the display as random indications at a non-repeating range which may readily be distinguished by an operator.

While systems in accordance with the invention cannot be considered to provide long range operation when compared to electromagnetic radar, they open up a wide range of possibilities for the uses of sound transmission in general. This is particularly true because of the simplicity of the systems which not only means that they can be provided at low cost, but also greatly increases system reliability. Because acoustic waves are used alone, the systems may be employed in environments in which the electromagnetic radiation spectrum is otherwise virtually fully occupied.

The system of FIG. 1 has been described in conjunction with object detecting and ranging, and as such may be used in a wide number of applications. Thus it may be employed on a shore station or ship, to detect and locate other vessels within its range. It may be used at an airport, as another example, for providing a continuous display of the position of aircraft taxiing on the airport. In both these applications, the utility of the system is markedly increased by the fact that the system operates better in fog, rain and high humidity conditions under which many electromagnetic radar systems are unreliable.

Other uses will suggest themselves to those skilled in the art. An acoustic ranging system mounted on a vehicle may be used to provide a precise measure of the distance between that vehicle and other vehicles. Whether the vehicles are automobiles on a highway or ships moving along parallel paths under confined conditions, acoustic ranging systems in accordance with the present invention effectively bridge the gap between the necessity for visual contact and the far greater ranges at which electromagnetic radar becomes truly effective. The systems may also be used for obstacle detection and distance measuring of other kinds. When mounted on vertically moving craft (helicopter, hover craft or VTOL) and directed toward the ground, for example, they provide a very accurate indication of the terrain clearance distance. Similarly, the systems may be mounted on ships and used for ascertaining the distance to a shore line or to a buoy or lightship.

Other aspects of the invention permit the construction and use of the systems for a wide variety of purposes other than those discussed. Acoustic waves at or in the region of 40 kc. may obviously be modulated with audio or other signals to permit communication and signaling between two points. Modulated or unmodulated waves may also be transmitted from fixed stations to provide reference signals upon which ships or vehicles containing directional receivers may home or locate their own position. The ability to transmit large amounts of acoustic power over relatively long distances also is directly applicable to automatic control systems of the types currently in use. It is well known also that animals and birds are often affected by sounds at much higher frequencies than those to which the human ear is sensitive. Accordingly, a concentrated acoustic wave beam directed toward wild animals and birds may be used to frighten them away from buildings, airport runways, railroad tracks and similar locales in which their presence is not desired.

Particular circuits which satisfactorily perform the functions of the preamplifier stages 15 in the arrangement of FIG. 1 are shown in FIG. 3. In this preferred arrangement, first and second preamplifier stages are coupled by a double shielded cable in a special fashion. The first preamplifier stage 15a is coupled to the receiving transducer by an LC network 41 which permits control of the bandwidth of the receiving transducer. The input signals are applied to the control grid 43 of a tetrode amplifier 42 which provides low noise amplification of the low level input signals. Power is derived from a +22.5 volt source (the battery 46) for both the plate current and filament heating of the tetrode amplifier 42. This initial preamplifier stage 15a isolates the transducer 13 from the receiver circuitry, and provides an effective impedance match between the transducer and the subsequent receiver circuitry.

Output voltages from the first preamplifier stage 15a are taken across the plate 44 of the tetrode amplifier 42 and the filament-cathode coupling 45, with the plate 44 being coupled to the center conductor 47 of a double shielded cable 50 and the filament-cathode 45 being coupled to the outer shield 49 of the cable 50 which connects to the second preamplifier stage 15b. The inner shield 48 is not connected at the input side. The second preamplifier stage 15b includes a pair of cascaded transistor amplifiers. Input signals provided to the base of the first transistor 55 are amplified, and the amplified signals are coupled to the base of the second transistor 56 from the collector of the first. The subsequently amplified signals are coupled out to the next stage of the system (the tuned amplifier 17 of FIG. 1) from the collector of the second transistor. The second preamplifier stage 15b is connected to the negative terminal and +22.5 volt so that a complete D.C. path for the first and second preamplifier stages is provided across the battery 46 via the outer shield 49 of the cable 50.

The circuit of FIG. 3 also has a number of particular advantageous features. With the floating inner shield 48 of the cable coupled into the midpoint of the series pair of resistors 52, 53 which are coupled to the emitter of the first transistor 55, the effective cable capacitance is appreciably lowered. Thus signal losses which might be due to the input cable capacitance are markedly reduced.

In the coupling to the amplifier 42 is included a small signal diode 58 which performs a signal limiting action. The diode is so connected that positive excursions in the input signal greater than a selected level are shunted to the common connection by diode breakdown. It is preferred in this example to employ small signal germanium diodes having a breakdown voltage of approximately 300 millivolts and to adjust receiver parameters so that signals up to 500 millivolts do not block or paralyze the receiver. The 300 millivolt input signal level helps to establish constant loop gain during the transmit cycle. The second preamplifier stage also includes a feedback coupling between the second and first transistors, to attenuate stray pickup and noise at low and medium frequencies.

Signals from the preamplifier stages 15 are supplied to the tuned amplifier 17, a preferred example of which is shown in detail in FIG. 4. The tuned amplifier 17 is a narrow bandpass device utilizing successive tuned transistor amplifier circuits 60 and 61 in cascade. Each of the transistor amplifiers 60, 61 is adjusted by means of the tunable LC networks 66, 67 respectively, to have its greatest sensitivity to the signal at the resonant frequency of the transducer, and provides attenuation of greater than 20 db per octave outside the amplifier passband. With the circuit arrangement shown, the actual attenuation of lower frequencies is in excess of 40 db. The second tuned circuit stage 61 drives an emitter follower transistor 62 which provides output signals from the tuned amplifier to the succeeding driver amplifier stage 18 of FIG. 1.

In the driver amplifier 18, three successive transistors 70, 71 and 72 are used as inverter amplifier stages, followed by a fourth transistor 73 used as an emitter follower. A potentiometer 75 coupled to the emitter of the emitter follower stage 73 provides adjustment of the amplitude of the output signal which is derived for a given amplitude of input signal, thus permitting control of the loop gain which determines the power of the transmitted pulse during the transmit mode of operation. The driver amplifier stages thus provide a further limiting of the acoustically fedback signal derived from transmitted pulses.

The RF signal derived from the driver amplifier 18 represents an oscillatory burst corresponding to the transmitted pulse or the received echo pulse. In the electronic switch 24 an example of which is shown schematically in detail in FIG. 6, these oscillatory bursts are very simply converted to pulse signals for controlling the associated display devices. The input signal is first passed through a voltage doubler 80, and a D.C. signal is derived having a pulse envelope. This D.C. signal is applied to the base of a first transistor 82, the collector of which is in turn coupled to the base of a second transistor 83 which is in circuit with the coil 84 of relay circuits intercoupled in the visual display devices. The second transistor is normally conducting in the absence of an input signal, so that the armatures which are associated with the coil 84 are normally actuated in a controlled position. Thus the electronic switch 24 may be considered to be normally energized. This energization is interrupted by the application of a received rectified signal from the voltage doubler 80 to the first transistor 82. Control over the energization level of the relay circuits is provided by an adjustable resistor 81 coupled in the collector circuit of the first transistor 82.

Figure 7:
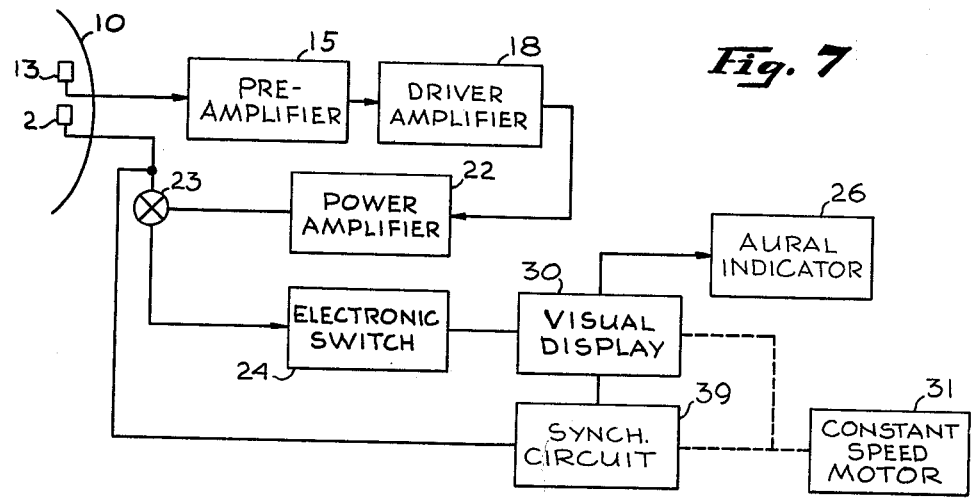
FIG. 7 is a block diagram of one alternative sound transmission system in accordance with the present invention.

A different form of system in accordance with the invention, having particular utility where simplicity is desired, is shown in the block diagram of FIG. 7. Units having like designations and functions corresponding to those of FIG. 1 have been given like number for simplicity. In this arrangement, the complete signal loop including both acoustic and electrical couplings is retained. A transmitting transducer 12 and an adjacent but spaced apart receiving transducer 13 function together with a parabolic reflector 10. Electrical signals derived from the receiving transducer 13 are coupled to a preamplifier 15, which in turn is coupled to driver amplifier circuits 18 which drive a power amplifier 22. The power amplifier 22 is coupled to the transmitting transducer 12 through a signal branching network 23 whose other output arm is coupled to the electronic switch 24. The signal branching network effectively isolates the transmitting transducer 12 arm from the electronic switch 24 arm and may consist, for example, of parallel amplifier circuits coupled to the output terminal of the power amplifier 22.

The transmitting transducer arm of the signal branching network 23 is coupled to the synchronizing circuit 39 which, together with the visual display 30, is controlled by a constant speed motor 31. An aural indicator 26 may be coupled to the visual display 30 in the manner previously described.

The simplified receiver circuits provided by this arrangement generate an oscillatory burst from the transmitting transducer 12 during intervals in which the selective ground connection is removed from the arm connected to the transmitting transducer 12. As with the arrangement of FIG. 1, upon removal of the ground connection random noise initiates a very rapid buildup at the selected frequency at which the transducers 12, 13 are resonant, providing a transmitted burst for a selected duration initiated and terminated by the synchronizing circuit 39. During this interval, indications of the presence of the transmitted pulse are provided through the electronic switch 24 to the visual display 30 and the aural indicator 26. Upon termination of the transmitted pulse burst, the ground connection is reinserted at the transmitting transducer 12 arm, and the power amplifier 22 is, in effect, coupled only to the electronic switch 24. Received echo bursts which excite the receiving transducer 13 then are successively amplified by the preamplifier stages 15, the driver amplifier 18 and the power amplifier 22 so that the electronic switch 24 provides a pulse to actuate the visual display 30 and aural indicator 26.

This simplified system utilizes the receiving transducer 13, preamplifier circuit 15 combination alone to restrict the passband of the received signals and to stabilize the transmitted frequency. Because of the control which is exercised over these relationships, however, a high order of frequency stability and a high degree of sensitivity are still achieved.

Figure 8:
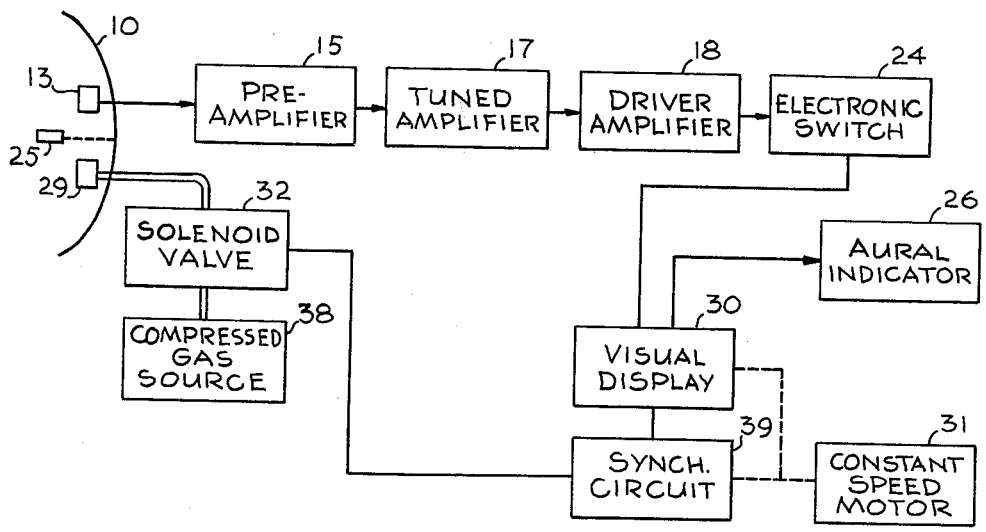
FIG. 8 is a block diagram of a different alternative form of sound transmission system in accordance with the invention.

In some instances, a transmitting transducer of the electrostrictive or magnetostrictive type may not be sufficiently powerful to cover a desired wider range for detection, location or other purposes. In the arrangement of FIG. 8, for example, the transmitting element may be an acoustic-compressed gas type of oscillator 29 providing high power ultrasonic waves at the selected frequency from an acoustic energy supply consisting of a compressed gas source 38. With this arrangement, no acoustic coupling between the transmitting element and the receiving transducer is employed, but instead a baffle 25 is inserted between the oscillator element 29 and the receiving transducer 13 to prevent the carryover of excessive amounts of energy. The timing function is carried out under control of the synchronizing circuit 39 by a solenoid valve 32 coupled between the compressed gas source 38 and the acoustic oscillator 29.

In the transmitting phase, therefore, at a time determined by the synchronizing circuit 39, the solenoid valve 32 opens the gas coupling between the compressed gas source 38 and the transmitting acoustic oscillator 29 for an interval determined by the synchronizing circuit 39, and a high power oscillatory burst at the selected frequency is directed in a direction controlled by the parabolic reflector 10. Upon return of an echo, signals excited in the receiving transducer 13, are successively amplified as in the arrangement of FIG. 1 to derive a pulse suitable for actuating the visual display 30 and the aural indicator 26 to denote the range of the detected object. As with the arrangements previously discussed, appropriate adjustments may be made in the timing to insure a proper buildup of the transmitted pulse bursts at the acoustic oscillator 29 and proper time relation of the transmitted pulse burst with respect to the operation of the system in the determination of range. This system provides transmitted power of high intensity, and at a closely controlled frequency. For these reasons the acoustic oscillator device is preferred where the power level is a primary consideration as in omnidirectional beacon systems.

Although some alternative arrangements have been discussed, it will be appreciated that many others may be utilized within the concept of the invention. The parabolic reflector or other wave transducer may be mounted on a conventional antenna stand for providing scanning in both azimuth and elevation at a selected rate. The information derived from a system utilizing this arrangement is suitable for actuating any conventional plan position indication display, such as the display in polar coordinates using a storage or other type of cathode-ray tube. Although a synchronous motor is a simple and inexpensive way to achieve substantially constant speed operation, a number of controlled frequency devices, such as crystal controlled oscillators and tuning forks, may be substituted where a higher degree of precision or other frequency relationships are desired. It will also be recognized that the speed of rotation of the constant speed device may be varied electrically or mechanically so as to change the scale presented on the display device and to provide a different indication of range. This adjustment may concurrently be used to alter the width of the transmitted pulse.

While a number of different means of carrying out the various aspects of the invention have been suggested, it will be appreciated that the invention may be realized in a number of different ways. Accordingly, the invention should be considered to include all modifications, variations and alternative arrangements falling within the scope of the appended claims.

What is claimed is:

1. An acoustic wave transmission system including the combination of transmitting transducer means, receiving transducer means acoustically coupled by a direct path to the transmitting transducer means, receiving amplifier means coupled to the receiving transducer means, power amplifier means coupled to both the receiving amplifier means and to the transmitting transducer means, the transmitting means being energized by signals generated at the receiving transducer means, cyclically operable means coupled to the transmitting transducer means for maintaining the transmitting transducer means deenergized except for selected intervals during each cycle, and means coupled to the receiving amplifier means and to the cyclically operable means for indicating the time relation of received signals to the time of actuation of the transmitting transducer means.

2. An ultrasonic ranging and detection system including the combination of narrowband transducer means having a selected center frequency for converting acoustic waves to and from electrical signals, sound reflector means operatively associated with the transducer means for concentrating acoustic waves at the selected center frequency to and from the transducer means, amplifier means coupled to receive electrical signals from the transducer means, the amplifier means being tuned to the selected center frequency and having a passband equal to or narrower than the passband of the transducer means, the transducer means and amplifier means being coupled to form a self-oscillating system, and means responsive to the amplifier means for generating signals representative of the reception of electrical signals at the selected center frequency.

3. A system for actuating a transmitting acoustic transducer with high power electrical signal oscillations at a selected frequency and for a selected interval including a power amplifier coupled to the transmitting acoustic transducer, means coupled to the transmitting acoustic transducer for maintaining the transducer grounded except for a selected transmitting interval, a receiving acoustic transducer having the selected frequency as a nominal center frequency, and amplifier means coupling the receiving acoustic transducer to the power amplifier, the amplifier means including a tuned amplifier tuned to the selected frequency.

4. A system for actuating a transmitting acoustic transducer with high power electrical oscillations at a selected frequency and for a selected interval, including a power amplifier coupled to the transmitting acoustic transducer, means coupled to the transmitting acoustic transducer for maintaining the transducer grounded except for a selected transmitting interval, a receiving acoustic transducer having a nominal center frequency corresponding to that of the selected frequency, the receiving acoustic transducer being responsive to random excitations at the selected frequency, and successive amplifier means coupling the receiving acoustic transducer to the power amplifier, the amplifier means including signal limiting means, a narrowband tuned amplifier tuned to the selected frequency, and gain control means, there being an acoustic coupling between the transmitting acoustic transducer and the receiving acoustic transducer, whereby an electrical signal loop having a maximum gain determined by the gain control means is completed by the acoustic coupling to cause excitation of the transmitting acoustic transducer at the selected frequency, with rapid signal buildup during the selected transmitting interval.

5. A system for using reflected acoustic waves from a distant object to determine the distance of the object, including a wave focusing device, a transmitting and a receiving transducer positioned in focal regions of the wave focusing device, the transmitting and receiving transducers having selected and like center frequencies, a power amplifier coupled to the transmitting transducer, a preamplifier circuit including a signal limiting circuit coupled to the receiving transducer, a narrowband tuned amplifier circuit coupled to the preamplifier circuit, the tuned amplifier circuit being tuned to the selected center frequency, a driver amplifier circuit including a gain control adjustment and coupled to the tuned amplifier circuit, the output terminal of the driver amplifier circuit being coupled to the power amplifier, a constant speed motor, circuit means normally coupling the transmitting transducer to a common potential, synchronizing circuit means responsive to the rotation of a constant speed motor for disabling the common potential coupling to the transmitting transducer for selected intervals beginning at selected index times relative to the rotation of the constant speed motor, a rotating display device including an index slot disposed along a selected radius, the display device being driven in synchronism with the constant speed motor, an electronic switch circuit coupled to the drive amplifier circuit and operable in response to received echo signals, and light generating means disposed adjacent the display device and coupled to the synchronizing circuit means and the electronic switch circuit for providing pulsed illumination through the index slot at the index time and also in response to received echo signals.

6. In an ultrasonic detecting and ranging system, an arrangement for repetitively generating an acoustic signal of controlled duration comprising receiving and transmitting transducers in coupled relationship, the receiving transducer being positioned to respond to random acoustic waves in an adjacent medium, amplifying means interconnecting the receiving and transmitting transducers to complete a feedback loop therewith, disabling means connected to the feedback loop for disabling a portion of the amplifying means, and means for repetitively removing the disabling means to permit the rapid buildup of oscillations applied to the transmitting transducer for a selected interval.

7. In an ultrasonic detecting and ranging system including an operative signal path between input and output means, an arrangement for repetitively generating an acoustic signal of controlled duration comprising receiving and transmitting transducers in coupled relationship, the receiving transducer being positioned to respond to random acoustic waves in an adjacent medium, first and second amplifying means interconnecting the receiving and transmitting transducers to complete a feedback loop therewith, means coupling the first amplifying means within the operative signal path for the system, disabling means connected to the feedback loop for disabling the second amplifying means, and means for repetitively removing the disabling means to permit the rapid buildup of oscillations applied to the transmitting transducer for a selected interval.

8. In an ultrasonic detecting and ranging system having an operative signal path for energizing a display device in response to received signals in excess of a predetermined amplitude, an arrangement for repetitively generating an acoustic signal of controlled duration comprising receiving and transmitting transducers in coupled relationship, the receiving transducer being positioned to respond to random acoustic waves in an adjacent medium, first amplifying means within the operative signal path for coupling the receiving transducers thereto, second amplifying means coupled to the first amplifying means and to the transmitting transducer to complete a feedback loop for energizing the transmitting transducer in response to acoustic radiations impinging upon the receiving transducer, and means for disabling the second amplifying means except during a selected interval when acoustic waves are to be radiated from the transmitting transducer.

References Cited by the Examiner
UNITED STATES PATENTS

| | | | |
|---|---|---|---|
| 2,098,287 | 11/37 | Gent | 340—3 X |
| 2,232,096 | 2/41 | Dane | 343—113 X |
| 2,257,763 | 10/41 | Petterson | 340—3 X |
| 2,400,309 | 5/46 | Kock | 340—16 X |
| 2,400,796 | 5/46 | Watts et al. | 340—3 |
| 2,476,902 | 7/49 | Paine et al. | 340—3 |
| 2,531,187 | 11/50 | Yardeny et al. | 307—112 |
| 2,576,903 | 11/51 | Imm | 307—112 |
| 2,750,574 | 6/56 | Fryklund | 340—3 |
| 2,802,178 | 8/57 | Shafer et al. | 330—67 |
| 2,919,313 | 12/59 | Johnson | 330—31 |
| 2,948,879 | 8/60 | Padberg et al. | 340—1 |
| 3,028,578 | 4/62 | Stanton | 340—1 |
| 3,029,317 | 4/62 | Davidson | 330—109 |
| 3,031,644 | 4/62 | Hisserich et al. | 340—3 |
| 3,056,928 | 10/62 | Marks | 330—109 |

CHESTER L. JUSTUS, *Primary Examiner.*

KATHLEEN H. CLAFFY, *Examiner.*